UNITED STATES PATENT OFFICE.

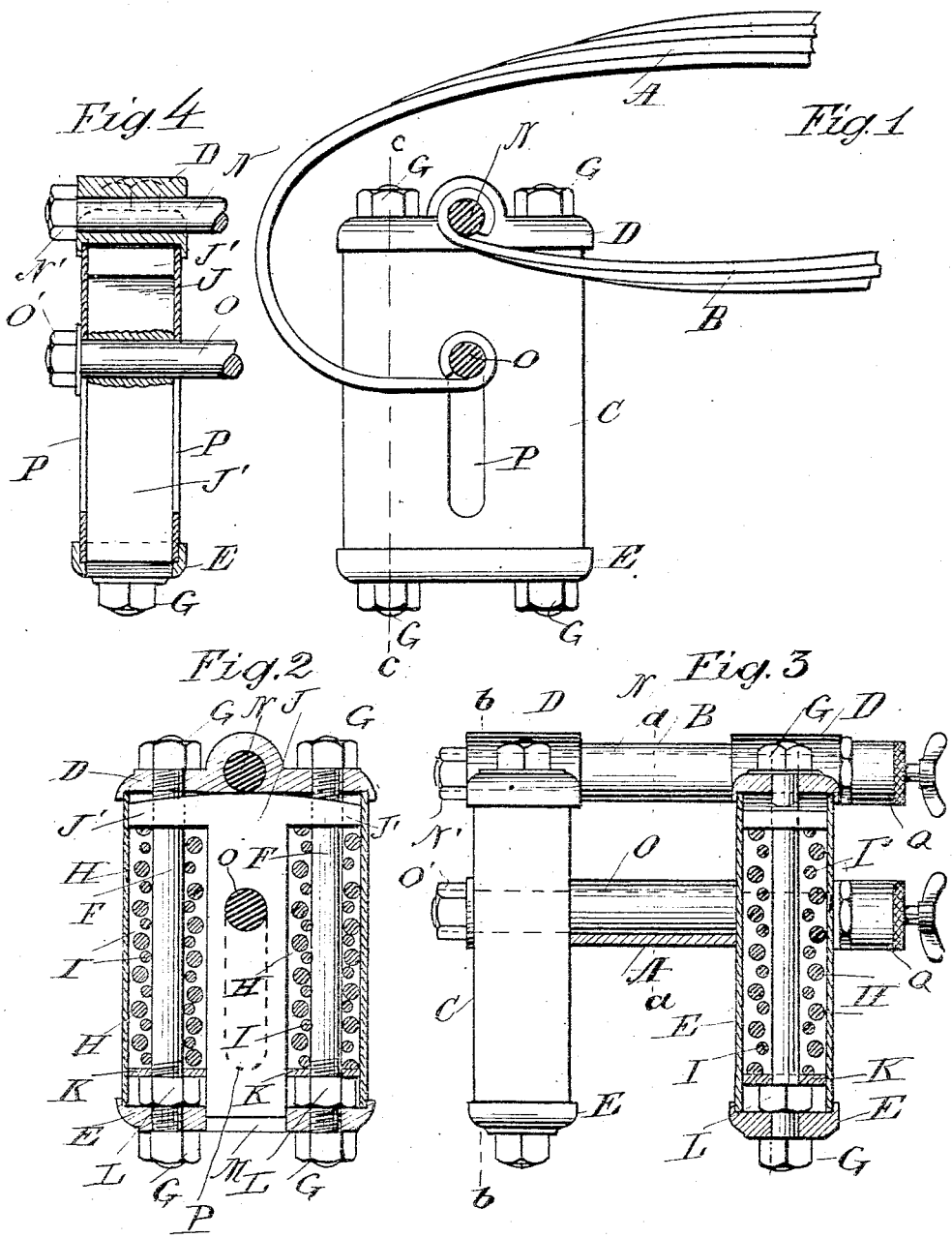

JULIUS BROCCOLIN, OF CLEVELAND, OHIO, ASSIGNOR OF ONE-HALF TO RICHARD ATKINSON, OF CLEVELAND, OHIO.

SHOCK-ABSORBER.

1,110,876.

Specification of Letters Patent.  Patented Sept. 15, 1914.

Application filed February 24, 1914. Serial No. 820,488.

*To all whom it may concern:*

Be it known that I, JULIUS BROCCOLIN, a citizen of the United States, and resident of Cleveland, in the county of Cuyahoga and State of Ohio, have invented certain new and useful Improvements in Shock-Absorber, of which I hereby declare the following to be a full, clear, and exact description, such as will enable others skilled in the art to which it appertains to make and use the same.

The objects of the invention are to provide a simple and compact form of supplementary device for assisting the springs of an automobile or other vehicle to absorb the shock occasioned by the impact of the wheels upon the obstructions of the roadway, such as stones or ruts, before the shock is transmitted to the body of the vehicle.

The particular objects of the invention are to provide a device of simple and compact form and in which all the operating parts are inclosed to protect them from dust and moisture.

The objects are accomplished by inclosing all working, guided and supported parts within a single casing, whereby no sliding parts are projected in such a manner as to be exposed exteriorly of the casing, and which therefore cannot become bent or distorted in shape when subjected to pressure or irregular or twisting strains while in use.

The invention further comprises the combination and arrangement of the case with a plunger inclosed therein, and in the construction of details hereinafter further described, shown in the accompanying drawings and specifically pointed out in the claims.

In the accompanying drawings Figure 1 is a transverse section of the device taken on line *a—a* Fig. 3; Fig. 2 is a vertical section thereof taken on line *b—b* Fig. 3; Fig. 3 is a vertical section thereof on line *c—c* Fig. 1. Fig. 4 is a transverse section taken on the center line of Fig. 2. In these views A and B represent the upper and lower side springs of an automobile or other vehicle. C is a casing provided with the rigid heads D and E. In this casing all the working parts are inclosed and protected from dust and sand so that there will be very little wear of any kind upon the springs or their bearings and practically no attention need be paid to them after they are installed. The caps are bolted together and to the casing by means of the rods F, F having screw threaded ends and nuts G, G, thereon. These rods pass through the inclosure of the casing and form guides for the coiled springs H, H, and I, I. Within the casing is located the T shaped cross head or plunger J which is of the same width as the inclosure and slides upon the side plates thereof. This plunger is provided with the laterally extending arms J', J', which engage with the springs at their upper ends. The lower ends of the springs preferably rest upon washers K, K, which are adjustably held upon the rods F, F, to control the tension of the springs by means of the nuts L, L, placed upon the rods F, F, inside of the lower head E. The rods F, F, pass through the lateral extensions J' J' of the plunger and form guides therefor.

The body of the plunger J is rectilinear and reciprocates in the guide opening M in the lower head E.

The lower side spring B is connected with the supplemental device by means of the rod N which is inserted in the caps of adjoining casings, and the upper side spring A is connected with the supplemental device by means of the rod O which passes through slots P in the adjacent sides of the adjoining casings, and connects the two plungers J, J, together.

Having described the invention what I claim as new and desire to secure by Letters Patent is:

1. In a shock absorber, in combination, a closed casing, a plunger reciprocable therein, and provided with lateral extensions, guide rods for said plunger extending through openings in said lateral extensions, said guide rods secured in the upper and lower walls of said casing, the lower wall of said casing provided with a guide opening in which the lower extremity of said plunger moves, compression springs in said case encircling said guide rods, underneath said lateral extensions of the plunger, a spring engaging member secured to the upper wall of said casing, and a second spring engaging member secured to said plunger, the walls of said casing having vertical slots through which said second spring engaging member passes.

2. In a shock absorber, the combination with a pair of springs for a vehicle, and a pair of closed casings, of a T shaped plunger reciprocable in each casing, a member engaging one of said springs and attached to and connecting the upper walls of said casings, a second member engaging the other spring, and attached to said plungers in said casings, the vertical walls of said casings provided with slots through which said second spring engaging member passes, and compression springs inclosed within said casings, and positioned underneath the heads of said T headed plungers.

3. In a shock absorber, a closed casing, a T shaped plunger reciprocable therein, guide rods passing through the lateral extensions of said plunger and secured in the said casing, and forming guides for said extensions, and the lower wall of said casing provided with a guide opening through which the lower end of said plunger passes, springs inclosed within said casing and encircling said guide rods, a rod secured to the upper wall of said casing and a second rod secured to said plunger, said casing provided with vertical slots through which said second rod operates, a spring secured to each rod exterior of said casing, and means for securing the extremities of said rods.

4. In a shock absorber, in which all operated parts are inclosed, a closed casing, a plunger reciprocable within the casing, and provided with lateral extensions, springs inclosed between said extensions, and the lower wall of said casing, a spring engaging rod secured to the upper wall of the casing, and a second spring engaging rod secured to said plunger, the wall of said casing provided with an elongated opening through which said second rod operates, and means for guiding said plunger within said casing.

5. In a shock absorber, in combination with a pair of vehicle springs, a closed casing having removable upper and lower walls, a T shaped plunger therein, the lower wall of said casing provided with an opening through which the vertical central portion of the plunger reciprocates, springs within said casing upon which the lateral extensions of said plunger rest, guide rods passing through said springs and lateral extensions and through the upper and lower walls of said casing, means for securing said guide rods and thereby said upper and lower walls in place, a horizontal rod secured to the upper wall of the casing in central position, a second horizontal rod secured to said plunger and projecting through said case, the walls of said case provided with vertical slots through which said parallel rod passes, and means for securing said rods in said casing, said horizontal rods engaging the extremities of said vehicle springs.

In testimony whereof, I hereunto set my hand this 22" day of January 1914.

JULIUS BROCCOLIN.

In presence of—
 Wm. M. Monroe,
 Wm. J. Klotzbach.